United States Patent [19]

Sheth et al.

[11] Patent Number: 5,057,294

[45] Date of Patent: Oct. 15, 1991

[54] RECOVERY AND REGENERATION OF SPENT MHD SEED MATERIAL BY THE FORMATE PROCESS

[75] Inventors: Atul C. Sheth, Tullahoma; Jeffrey K. Holt, Manchester; Darryll G. Rasnake, Manchester, all of Tenn.; Robert L. Solomon, Seattle, Wash.; Gregory L. Wilson, Redmond, Wash.; Howard R. Herrigel, Seattle, Wash.

[73] Assignee: The University of Tennessee Research Corporation, Knoxville, Tenn.

[21] Appl. No.: 421,617

[22] Filed: Oct. 13, 1989

[51] Int. Cl.$^5$ .......................... B01J 8/00; C01B 17/00
[52] U.S. Cl. ...................................... 423/244; 423/555
[58] Field of Search .................. 423/244 R, 243, 555, 423/244 A

[56] References Cited

U.S. PATENT DOCUMENTS

| | | | |
|---|---|---|---|
| 1,161,239 | 11/1915 | Morgan | 423/421 |
| 1,260,944 | 3/1918 | Rody | 423/421 |
| 1,297,078 | 3/1919 | Brookby | 423/421 |
| 1,307,127 | 6/1919 | Hoskins | 423/421 |
| 1,452,186 | 4/1923 | Charlton et al. | 423/421 |
| 2,030,082 | 2/1936 | Wiedbrauck et al. | 23/63 |
| 2,043,534 | 6/1936 | Elod et al. | 260/114 |
| 2,163,466 | 6/1939 | Opatowski et al. | 23/143 |
| 3,690,818 | 9/1972 | Gorin et al. | 423/243 |
| 3,846,535 | 11/1974 | Fonseca | 427/242 |
| 4,239,996 | 12/1980 | Bhada et al. | 310/11 |
| 4,243,645 | 1/1981 | Lahoda | 423/428 |
| 4,327,070 | 4/1982 | Myers | 423/555 |
| 4,528,173 | 7/1985 | Seamans | 423/421 |

FOREIGN PATENT DOCUMENTS

| | | |
|---|---|---|
| 595709 | 3/1934 | Fed. Rep. of Germany . |
| 590158 | 12/1937 | Fed. Rep. of Germany . |
| 733945 | 10/1932 | France . |
| 179079 | 9/1934 | Switzerland . |
| 386208 | 1/1983 | United Kingdom . |

OTHER PUBLICATIONS

Plant-Growth Substances to Potassium Compounds, Encyclopedia of Chemical Technology, Third Edition, vol. 18, Kirk-Othmer.

Anion-Exchange Resin-Based Desulfurization Process for Alkali Sulfates, The University of Tennessee Space Institute Paper, Published Jun. 20, 1988, Sheth et al.

Seed Recovery and Regeneration in Coal-Fired, Open Magnetohydrodynamic Systems, Technical Economics, Syn Fuels and Coal Energy—1986, PD-Vol. S, Feb. 1986, Sheth et al., Edited by J. B. Dicks, Sponsored by ASME.

The Formate Process, E. Wiedbranck, Chem. Tech. 15, 1988-1990 (1942) Die Chemische Technik (15 Jahrgeng 1942. Nr. 17).

Zur Kenntnisder Formiat Pottasche, Chemiscke Technik, H. Anders, 1950, vol. 2, pp. 185-186.

Jackson, D. M., "Evaluation of Seed Regeneration Processes for Coal-Fired MMD Power Plants" FG 1760-36, A Report Prepared by the University of Tennessee Space Institute for DOE Under Contract No. DE-AC02-79ET-10815, Jul. 1985.

(List continued on next page.)

Primary Examiner—Gregory A. Heller
Attorney, Agent, or Firm—Luedeka, Hodges, Neely & Graham

[57] ABSTRACT

The specification discloses a spent seed recovery and regeneration process for an MHM power plant employing an alkali metal salt seed material such as potassium salt wherein the spent potassium seed in the form of potassium sulfate is collected from the flue gas and reacted with calcium hydroxide and carbon monoxide in an aqueous solution to cause the formation of calcium sulfate and potassium formate. The pH of the solution is adjusted to supress formation of formic acid and to promote precipitation of any dissolved calcium salts. The solution containing potassium formate is then employed to provide the potassium salt in the form of potassium formate or, optionally, by heating the potassium formate under oxidizing conditions to convert the potassium formate to potassium carbonate.

10 Claims, 3 Drawing Sheets

OTHER PUBLICATIONS

Matty et al., "Evaluation of Alternative Seed Regenerative Seed Regeneration Processes Applicable to a Coal-Fired MMD Power Plant", University of Tennessee Space Institute, Under Contract No. EX-76-C-0-1-1760, Jan. 4, 1979.

Sheth et al., "Evaluation of Available MMD Seed Regeneration Process on the Basis of Energy Considerations", ANL/MMD-78≧4, A Report Prepared by Argonne National Laboratory for DOE Under Contract No. W-31-109-Eng-38, Sep. 1978.

Krumreich, B. M.. "Seed Regeneration Processes for Coal-Fired MMD Power Plants," DOE/CH-1008-14, A Report Prepared by the Babcock and Wilcox Company for DOE Under Contract No. DE-AG-02-79CH10018, May 1985.

RECOVERY AND REGENERATION OF SPENT MHD SEED MATERIAL BY THE FORMATE PROCESS

This invention was made with government support under Contract No. DE-AC22-87-PC79671 awarded by the Department of Energy. The government has certain rights in this invention.

The present invention relates to processes for the recovery and regeneration of spent MHD seed material and more specifically relates to a spent seed recovery and regeneration process for an MHD power plant employing an alkali metal salt seed material such as a potassium salt wherein potassium is recovered from the spent seed and regenerated to a sulfur-free form using the formate route.

Magnetohydrodynamics (MHD) power generation is based on the principal of direct generation of electricity when a high-temperature, high-velocity, electrically conductive working fluid is passed through a magnetic field. In a coal-fired system, the working fluid is obtained by burning the coal and seeding the combustion gases with an easily ionizable material, such as an alkali metal salt.

An MHD power system offers the potential for increased overall efficiency and a built-in sulfur removal capability. That is, potassium salts, which are the generally preferred seed material, also react with and remove sulfur dioxide from the flue gas if the potassium salt is introduced in a sulfur-free form. Because of the high cost of the seed material and the large quantities of seed required, a once-thorough system which produces potassium sulfate as a disposable spent seed is not economically feasible. Considerable efforts are now being made toward the development of an economical and environmentally acceptable seed recovery and regeneration process for MHD applications.

Accordingly, it is an object of the present invention to provide a process for the recovery and regeneration of spent seed material in MHD applications.

Another object of the invention is the provision of a seed recovery and regeneration process for an MHD plant employing a potassium salt seed material which yields a high recovery of potassium in a sulfur-free form using only a few processing steps which are relatively easy to control and inexpensive to operate.

A further object of the invention is to provide an MHD spent seed recovery and regeneration process of the character described which is economical and which is readily integrated into an overall MHD power plant.

An additional object of the invention is to provide an MHD spent seed recovery and regeneration process which minimizes adverse environmental impacts.

Yet another object of the invention is to provide an MHD spent seed recovery and regeneration process wherein the processing steps are carried out under relatively mild conditions.

Still another object of the invention is to provide an MHD spent seed recovery and regeneration process which employs improved unit operations that avoid drawbacks associated with prior technology.

The foregoing and other objects and advantages are realized in the present invention of a process for the recovery and regeneration of spent seed in an MHD power plant which employs an alkali metal salt such as a potassium salt as the seed material for seeding the flue gas produced by the combustion of a sulfur-containing fossil fuel. The potassium salt ionizes in the high-temperature flue gas to produce an ionized plasma so that the gas will be electrically conductive. The high-temperature, electrically conductive gas is passed through a magnetic field at a high velocity whereupon an electric current is generatd by the interaction of the gas and the magnetic field. Potassium ions in the gas react with sulfur dioxide and slag produced by combustion of the fuel to form solid combustion products including a spent seed material containing potassium sulfate and a slag material containing potassium aluminosilicates.

According to its more general aspects, the invention comprises collecting the combustion products from the gas and dissolving the potassium sulfate from the spent seed in water to provide an aqueous solution thereof. The potassium sulfate in the solution is then reacted with calcium hydroxide and carbon monoxide to form calcium sulfate and potassium formate. The pH of the resulting solution is adjusted to promote the precipitation of any dissolved calcium salts and to supress the formation of formic acid. The solution containing potassium formate is then employed as a source for the potassium salt seed material. In a preferred embodiment, the potassium formate is used to provide the potassium salt in the form of potassium carbonate by heating the potassium formate under oxidizing conditions to convert the potassium formate to potassium carbonate.

According to a particularly advantageous feature of the invention, the slag material is digested using a calcium hydroxide slurry under conditions such that the calcium from the calcium hydroxide in the solution exchanges with potassium in the potassium aluminosilicates to form potassium hydroxide in the solution and insoluble calcium aluminosilicates. The potassium hydroxide solution is then employed to adjust the pH of the potassium formate solution for precipitation of calcium salts and formic acid supression as aforesaid.

The invention will now be described in greater detail with reference to the drawings in which.

Figure 4:
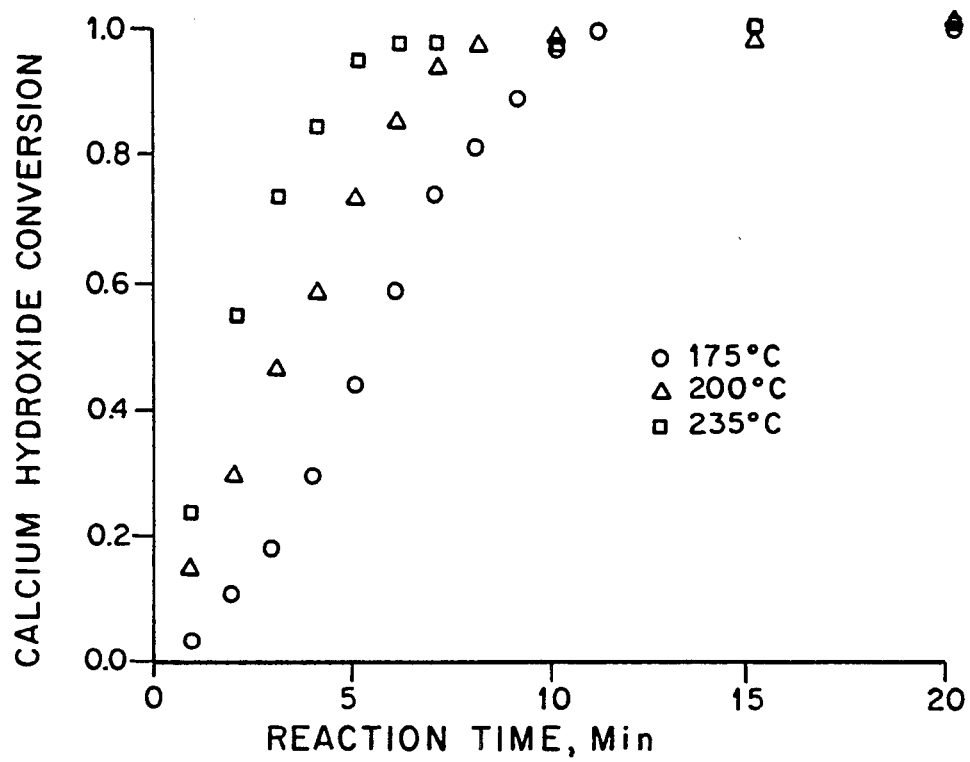
Figure 5:
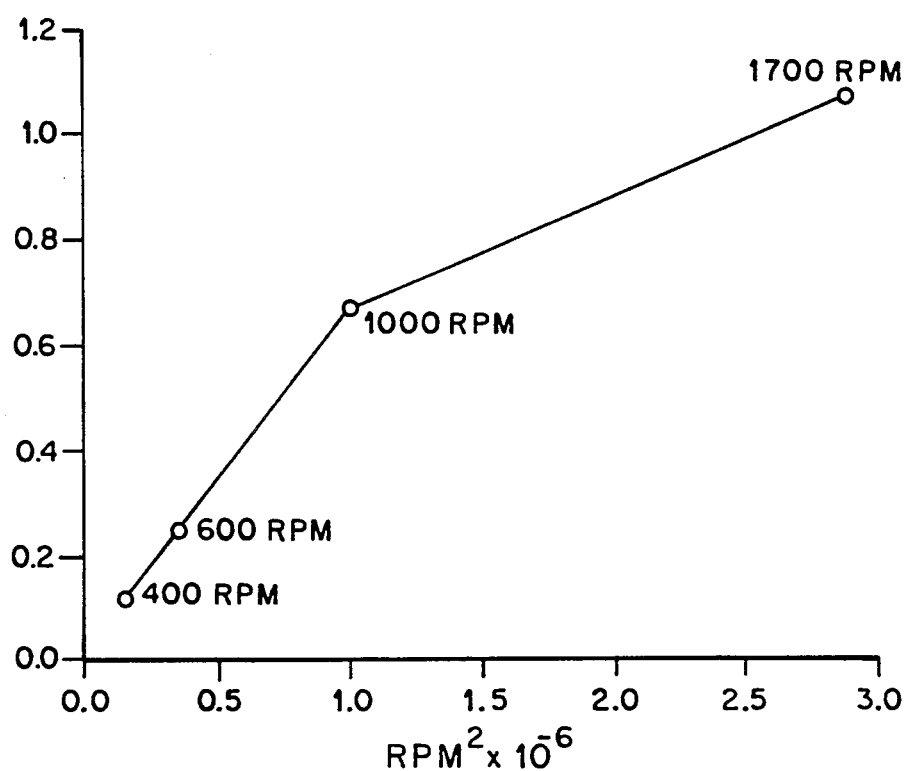

FIG. 4 is a plot of calcium hydroxide conversion versus reaction time for calcium hydroxide conversions at various temperatures to illustrate the effect of temperature and time on the rate of conversion; and FIG. 5 is plot of the square of the mixing speed versus the reciprocal of the time required to reduce the formate reactor pressure by 100 psig to illustrate the effect of mixing speed on the rate of CO comsumption which is related to formate formation in the reaction.

Figure 1:
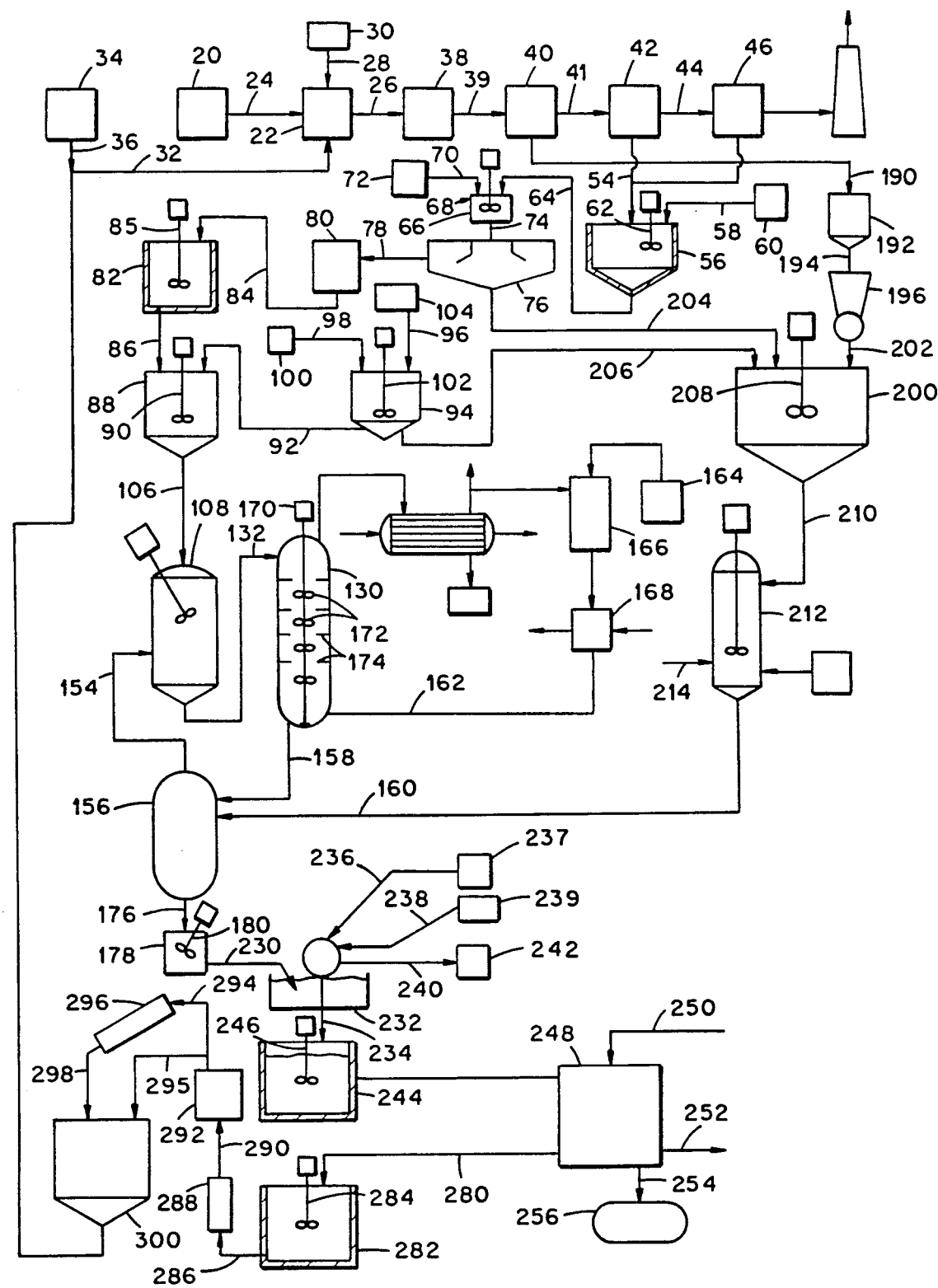
FIG. 1 is a process flow diagram illustrating features of a preferred embodiment of the invention.

With reference now to FIG. 1, the basic components of an MHD coal-fired system are illustrated diagrammatically at the top of the drawing. It is noted that in FIG. 1 and in the accompanying description, conventional components such as pumps, control features, detailed equipment descriptions and operating instructions and the like, are generally omitted for the purpose of clarity.

In the MHD system of FIG. 1, coal is provided from a storage facility 20 to a combustor 22 by means of a conduit 24 and is there combined with oxygen in a combustion process to produce a high-temperature, high-velocity flue gas in conduit 26. Typically, in an MHD plant burning coal, the combustion is carried out under reducing conditions with a stoichiometric excess of the fuel relative to oxygen. Accordingly, the air for combustion is provided at a controlled rate by way of conduit 28 from a blower 30.

An alkali metal salt seed material such as a potassium salt is injected into the combustor 22 via main seed feed conduit 32. Alternately, the seed material may be mixed with coal entering the combustor 22 in conduit 24. The weight percent of seed material relative to coal is typically about 12 to 13%. Potassium salts which provide the preferred seed material for use in the process of the invention are potassium carbonates and potassium formate. Potassium carbonate is particularly preferred because it: results in a higher conductivity of the flue gas. As will be described, the potassium salt is provided in large part by potassium which is recovered from portions of the MHD plant downstream of the combustor 22 and regenerated to the desired form according to the process of the invention. Make-up potassium salt may be provided from a storage facility indicated at 34 and supplied to the main seed feed conduit 32 via conduit 36.

In the combustor 22, as a result of the high-temperature conditions, the potassium salt readily dissociates resulting in a significant concentration of free potassium ions in the flue gas leaving in conduit 26 and rendering the gas electrically conductive. The gas leaves the combustor in conduit 26 at a temperature of about 5,000° F. and is accelerated to a high velocity of about 2,500 ft/sec. through a magnetic field generated in a magnetic core section indicated at 38. Upon passage of the high-temperature, high-velocity ionized gas through the core section 38, an electric current is generated in electrodes (not shown) and conducted to a transformer to provide a useful source of electricity.

The hot flue gas is conducted from the core section 38 in conduit 39 to a radiant furnace 40 and then on in conduit 41 to a conventional superheater/air heater section 42 where the heat of the gas is used to produce steam for the turbine generator in a conventional fashion. Traversal of the gas through the section 42 reduces the temperature of the gas to about 500° to 600° F. By this point, potassium has reacted with sulfur dioxide produced from the combustion of the coal in the combustor 22, resulting in the formation of potassium sulfate or "spent seed" as often referred to herein. About 85% of the potassium from the seed submitted to the combustor 22 combines with sulfur to form potassium sulfate in the spent seed. This material is entrained in the gas leaving the section 42 in conduit 44 and is collected in a bag house or electrostatic precipitator indicated generally at 46 along with a small amount of fly ash or slag (referred to hereinafter as "slag") material containing the balance of the potassium in the form of potassium aluminosilicates.

Of the 15% or so of the potassium which forms potassium aluminosilicates, about two-thirds or 10% of the total potassium is typically accounted for in slag deposits in the radiant furnace 40. About one-third or 5% of the total potassium is typically present in the slag deposited in the superheater/air heater section 42 and the bag house section 46. The present invention provides a process in which potassium is recovered from both the spent seed and the slag, and is then regenerated to a sulfur-free potassium salt for recycle to the combustor 22 in the main seed feed conduit 32.

For recovery of potassium from the spent seed and slag collected in the baghouse or precipitator, the collected spent seed along with slag particulates is initially transferred via conduit 54 leading from the superheater/air heater section 42 and the baghouse, electrostatic precipitator section 46 to a steam-jacketed dissolution tank 56 where the seed is mixed with water from conduit 58 leading from a water source 60. Mixing is assisted by a motor-driven impeller 62. The weight ratio of equivalent potassium sulfate to water in the dissolution step is preferably maintained in the range from about 8:100 to 14:100 and the temperature is maintained at about 60° to 95° C. Dissolution of water soluble potassium sulfate is approximately 100% with a residence time of only a few minutes under these conditions.

It is noted that the slag particulate present in the material collected from the baghouse or electrostatic precipitator tends to be relatively fine. These fine solids may cause significant abrasion of equipment in subsequent processing if the solution is subjected to vigorous mixing. Accordingly, it is desirable that the bulk of these fine solids be removed from the slurry following dissolution of the potassium sulfate so that the risk of equipment failure from abrasion is minimized. For this purpose, the slurry together with undissolved slag particulates is passed from the dissolution tank 56 through conduit 64 to a flash tank 66 and is there mixed under the influence of a motor-driven impeller 68 with a flocculant entering in conduit 70 from a flocculant production system 72 to increase the settling rate of any solids in the slurry. The flocculant is preferably of a weak anionic character. A suitable flocculant for use in the invention is the anionic flocculant sold under the trade name "Nalco 7766" by the Nalco Chemical Company of Oak Brook, Ill. The flocculant is preferably applied to provide a dose of approximately 20 ppm in the slurry to increase the settling rate of solids in the slurry by a factor of ten.

From the flash tank 66, the slurry is passed via conduit 74 to a clarifier 66. The clarifier 66 may be of standard design and construction and is sized to provide a preferred residence time of at least about 100 seconds to enable at least about 99% by weight of the solids in the slurry to settle. For acceptable operation, the solids density in the clarifier overflow should be in the neighborhood of 0.1 mg/cc and the solids density in the clarifier underflow should be at least about 0.3 g/cc. The temperature of the overflow solution passed from the clarifier 66 should be about 140° F. at this point.

The overflow from the clarifier 76 is passed in conduit 78 to an overflow tank 80 and then on to a steam-jacketed clarate tank 82 in conduit 84. In the clarate tank 82, the temperature of the solution is maintained at about 140° F. and efficient heat transfer is promoted using a motor-driven impeller 84.

The solution is conducted from the clarate tank 82 via conduit 86 to a spent seed-lime mixing tank 88 where the solution is mixed with a lime slurry entering in conduit 92 using a motor-driven impeller 90 to produce a spent seed/lime slurry. Conduit 92 delivers the lime slurry from a lime mix tank 94 where a lime slurry having a weight concentration of calcium hydroxide of about 20% is produced by mixing slaked lime from conduit 96 with water from conduit 98 connected to a water source 100. Mixing of the lime slurry in tank 94 is assisted by motor-driven impeller 102. Slaked lime delivered in conduit 96 may be produced in a lime plant of conventional design and construction illustrated generally at 104.

The lime slurry is delivered to the spent seed/lime mix tank 88 at a rate sufficient to provide a stoichiometric excess of calcium to potassium in the range of slightly in excess of 1 to about 1.2 according to the following formate reaction, with a stoichiometric excess of about 1.2 being preferred.

$$Ca(OH)_2 + K_2SO_4 + 2CO \rightarrow CaSO_4 + 2KCOOH \qquad (1)$$

In order to raise the temperature of the slurry from tank 88 to a preferred range of about 390° to 455° F. for carrying out the formate reaction, the slurry is conducted from tank 88 in conduit 106 through a series of direct contact heat exchangers illustrated generally at 108 prior to entering a formate reactor 130 in conduit 132. In the heat exchangers 108, the lime spent seed slurry from conduit 106 is contacted with high-temperature vapors passed into the heat exchangers in conduit 154 from a series of flash vessels indicated generally at 156. High-temperature vapors from the flash vessels 156 are released upon the mixing of products from the formate reactor 130 entering the flash vessel closest to the reactor conduit in 158, and from a slag leaching system entering the same vessel in conduit 160 as will be described.

The temperature of the formate reactor products in conduit 158 should be in the range of from about 390° F. to about 455° F. and the temperature of the slag leaching products in conduit 160 should be in the range from about 445° F. to about 480° F. As a result of the mixing of the streams, the vapors from the vessel closest to the reactor 130 should be in the neighborhood of 330° F. The heat transferred from the vapors to the slurry delivered to the reactor 130 in conduit 132 together with supplemental direct steam, if necessary, elevates the temperature of the solution entering the formate reactor 130 in conduit 132 to about 390° F. which is a preferred reaction temperature for the reaction to be carried out in the reactor 130. Also, through the use of an appropriate pumping system in conduit 132 and up-staging pumps in the series of heat exchangers 108, if necessary, the pressure of the slurry entering the reactor 130 is elevated to a preferred total pressure in the range from about 600 to about 670 psia.

The formate reactor 130 is preferably an upright columnar type vessel. The slurry from conduit 132 enters the reactor 130 from the top and flows downwardly, countercurrent to an upwardly flowing carbon monoxide gas supplied to the reactor 130 at the bottom from conduit 162. The partial pressure of carbon monoxide in the slurry within the reactor 130 is preferably at least about 450 psia. Carbon monoxide for the formate reactor 130 is produced using a carbon monoxide plant illustrated generally at 164 where carbon monoxide is generated from reforming of methane or from coal gasification, for example.

In order to bring the carbon monoxide up to desired delivery conditions for the formate reactor, a multi-stage carbon monoxide compressor 166 is employed together with a carbon monoxide vapor heater 168 both of which are arranged in conduit 162 leading from the carbon monoxide plant 164 to the reactor. The carbon monoxide compressor is adapted to elevate the carbon monoxide pressure to the desired pressure of 670 psia for release into the formate reactor 130 while limiting the temperature increase of the gas at the last stage compressor outlet to below about 350° F. The temperature limit is imposed at this point to avoid thermal decomposition of carbon monoxide to carbon dioxide and atomic carbon as may be caused by contact of the carbon monoxide gas with a catalyst such as metallic iron, nickel, cobalt and the like present in the materials of construction.

From the outlet of the multi-stage carbon monoxide compressor 166, the carbon monoxide gas is heated to the desired temperature of 392° F. for release into the formate reactor 130 using the carbon monoxide vapor heater 168, the components of which are formed of brass or other such material which does not act as a catalyst for the carbon monoxide decomposition reaction. All components such as piping, etc., between the carbon monoxide vapor heater 168 and the reactor 130 are formed of similar non-catalytic materials. The CO vapor heater 168 preferably employs plant steam and accomplishes heat transfer to the gas indirectly.

The formate reactor 130 is equipped with a motor-driven stirrer 170 having an elongated shaft with a plurality of vertically spaced-apart impellers 172. The impellers 172 cooperate with baffles 174 projecting from the inside of the tank to encourage vigorous mixing of the CO gas with the lime/spent seed slurry so that intimate contact is achieved between the reactants.

Aside from the temperature and pressure requirements referred to above and the desired stoichiometric excess of calcium hydroxide, other critical variables for the formate reaction include the degree of mixing and the residence time in the reactor. The degree of conversion of potassium sulfate to potassium formate is increased significantly for a given time period by vigorously mixing the slurry. Accordingly, the rotational velocity of the impeller 172 is maximized under the particular conditions of the reactor taking into account the size of the reactor, the shaft length of the impeller, etc. For example, for a small batch reactor in a laboratory, rpms of up to 1,700 can be achieved fairly easily. However, there are speed limitations for a full-scale reactor owing to the length of the shaft and the absolute tip-speed of the propeller blades. A practical limitation on the impeller shaft for large scale applications is believed to be about 20 feet. For this length shaft, an rpm of about 180 is believed to be a practical maximum. Because of these limitations, a multiple of formate reactors 130 may be used in parallel. Assuming that adequate mixing of the reactants can be achieved, a residence time in the range of at least about 10 minutes will result in a 95 to 99% potassium conversion.

As a specific example, for a feed in conduit 132 of 111,393 lbs/hr. (229.6 gpm) at a temperature of 392° F. and a pressure of 670 psia, and a carbon monoxide feed in conduit 162 of 4,666.33 lbs/hr. at a temperature of 351° F. and a pressure of 670 psia, the formate reactor 130 may have a diameter of 5.2 feet and a vertical height of 24 feet. Three such columns would be provided in parallel to handle the total feed of the spent seed/lime slurry in conduit 132 and the total feed of the carbon monoxide in conduit 162.

Because of the relatively high pressure and temperature within the reactor 130, and the reactive nature of carbon monoxide as referred to above, Monel 400 is the preferred material of construction for the components thereof. In this connection, it is to be noted that the hazards typically associated with free carbon monoxide gas are not presented in a situation such as encountered in the reactor since physical contact between wetted carbon monoxide gas in the slurry and the metal surfaces within the reactor is avoided.

In the formate reactor 130, potassium formate is produced according to equation (1) referred to above. The pH of the resulting slurry is in the range of 5 to 7. Under these conditions, the potassium formate is essentially completely dissolved in the aqueous portion of the slurry leaving the reactor in conduit 158. The calcium sulfate, however, which is the other principal product of the formate reaction, has only a slight solubility in water under these conditions (approximately 0.2 gms. per 100 gms. of water) and exists predominately in the reactor product in a dispersed solid form. It is noted in this respect that according to the invention, the formation of undesirable insoluble double salts of potassium and sodium is avoided by maintaining the temperature in the reactor above about 200° C. so that loss of potassium to the precipitate is minimized. Also, the formation of oxalates resulting from the decomposition of the formate is minimized by maintaining the reactor temperature at or below 235° C. Accordingly, by carrying out the reaction between these two temperatures, such adverse side reactions are avoided while still realizing potassium conversions of at least about 95%.

The reactor product mixture from the formate reactor 130 would typically have an acidic or slightly acidic pH. This solution during concentration may form formic acid. Formic acid is undesirable because of its corrosivity to metal parts encountered by the solution in subsequent operations. The relatively low pH is also undesirable for solubility reasons and particularly in relation to any calcium compounds still present in the solution. According to the present invention, the reactor product pH is increased to a sufficiently high level to suppress the subsequent formation of formic acid and to precipitate any dissolved calcium salts from the solution. Adjustment of the reactor product pH to a pH of at least about 10 is believed to be sufficient for these purposes and is accomplished advantageously in the illustrated embodiment by mixing the reactor product with a high pH slag leaching product introduced to flash vessels 156 through conduit 160 as described above. In the resulting solution, substantially all of the calcium salts including any excess of calcium formate are precipitated and contained within the slurry which is passed from the vessels 156 in conduit 176 to reactor product mix tank 178, where the contents are kept in a dispersed form with the assistance of motor-driven impeller 180.

Returning now to the block diagram illustrating the primary stages in the MHD process, slag material from the radiant furnace section 40, representing about 10% of the total potassium in the system, is collected as represented by conduit 190 and stored in a slag bin 192. The slag material is conveyed from bin 192 via conduit 194 to a crusher 196 where the slag is ground down to a sand-like consistency and metered into a slag/lime mix tank 200 via conduit 202 in preparation for the extraction of potassium from the slag by lime digestion. Maintaining the slag particle size at an average of about 190 microns (75 mesh) or smaller has been found to be desirable for obtaining potassium recoveries from the slag in the range of 75 to 80%.

Clarifier underflow from the clarifier 76 is also passed into the mix tank 200 in conduit 204. The underflow in conduit 204 has a solid content of approximately 75% with the solids being mainly fine slag particles of similar composition to the slag introduced from the conduit 202.

A supply of lime in the form of a lime slurry is delivered to mix tank 200 from lime mix tank 94 in conduit 206. The amount of lime supplied through conduit 206 is preferably sufficient to provide a 4:1 molar OH/K ratio in the resulting mixture. The tank contents are mixed with the assistance of a motor-driven impeller 208.

The slurry is passed from mix tank 200 in conduit 210 to a direct contact heater/mixer vessel 212 where the slurry is heated to a preferred digestion temperature in the range of from about 445° F. to 480° F. by the application of direct steam as at 214. The vessel 212 is sized to provide a residence time preferably of at least two hours.

During the digestion, calcium from the lime exchanges with potassium present as potassium aluminosilicates so that potassium hydroxide is formed in the slurry and calcium is taken out of the solution and bound in the insoluble aluminosilicates. The resulting slurry containing potassium hydroxide has a pH in the range of 12 to 14 causing precipitation of any calcium salts when mixed with the formate product. The slurry enters flash vessels 156 in conduit 160 as previously described for elevating the pH of the formate reactor product to supress formation of formic acid and to ensure precipitation of calcium salts present in the product from the formate reactor.

The mixed slurry from reactor product mix tank 178 is passed via conduit 230 to a reactor product filter designated generally at 232 where solids in the slurry are removed to produce a filtrate in conduit 234 containing dissolved potassium formate together with a small amount of potassium hydroxide and other soluble impurities. The product filter is preferably a vacuum filter-type.

A wash solution of approximately 10 to 20% of the initial slurry volume is applied as at 236 from a water source 237 to enable recovery of approximately 99% of the soluble potassium from the filter cake on the drum. It is noted that the inclusion of insoluble slag products improves the filtration rate by approximately 25%. The filtration rate is further increased approximately 50% by applying a filter pre-coat such as diatomaceous earth as at 238 from a pre-coat slurry source 239 at a rate sufficient to provide a pre-coat thickness of approximately 0.5 cm. Insolubles consisting chiefly of calcium sulfate, calcium hydroxide and compounds of silica and alumina are removed as non-toxic products of the process as at 240 for disposal or reprocessing, as desired, indicated generally at 242.

The filtrate from the reactor product filter 232 is conducted in conduit 234 to a steam-jacketed evaporator feed tank 244 for holding purposes, and is there stirred with the assistance of a motor-driven impeller 246 to ensure and maintain homogeneity. At this point, the temperature of the solution is about 214° F. The solution is passed from the feed tank 244 to a multiple effect evaporator system indicated generally at 248 to increase the potassium formate concentration to a highly concentrated solution of about 68% by weight which is just below the potassium formate precipitation point. The evaporators may be standard in design and construction including the typical series of separate effects. Each effect consists of a heat exchanger and an associated effect body. Process steam is used as at 250 to drive the heat exchange in the initial or first effect and generates a prime condensate as at 252. Steam condensate produced from heat exchange processes using the overhead vapors is removed as at 254 and collected in condensate tank 256 for use in the plant steam generating system.

The concentrated potassium formate solution leaves the multiple effect heat exchanger system 248 in conduit 280 at a temperature of about 200° F. and a pressure slightly above atmospheric. The material at this stage is in the form of a brine and is passed in conduit 282 to a steam-jacketed finishing evaporator feed tank 282 for holding purposes where it is stirred with the assistance of a motor-driven impeller 284.

The potassium formate brine is pumped from tank 282 in conduit 286 through a feed heater 288 to increase the temperature of the brine to about 350° F. The heat exchanger 288 is preferably of the indirect type using plant steam.

The preheated brine from heat exchanger 288 is passed via conduit 290 to a rising film finishing evaporator indicated generally at 292 which also employs plant steam for indirect heating to eliminate most of the water remaining in the slurry and produce a relatively dry potassium formate product in conduit 294 which may be passed directly to potassium salt bin 300 in conduit 295 for use in providing the seed material to the combustor 22 in conduit 32.

As a preferred step in the process of the invention the dried potassium formate is converted to potassium carbonate by delivering the product through conduit 294 to a rotating kiln 296 where the product is roasted under oxidizing conditions at a temperature of at least about 750° F. for at least about 30 minutes to completely oxidize the dried formate product to potassium carbonate. The potassium carbonate is delivered out of the kiln as at 298 and stored in the potassium salt bin 300 which is used to supply seed material to the combustor 22 in conduit 32.

Other uses of the potassium formate product include direct recycling of the concentrated solution to the combustor 22 for providing the potassium salt in the form of potassium formate out of the solution as it is vaporized in the combustor, and recycling of the potassium formate in a molten form (m.p. 334° F.) to the combustor.

The following nonlimiting examples further illustrate various features of the invention. Unless otherwise indicated, all percentages are by weight and all temperatures are degrees Fahrenheit.

EXAMPLE 1

Spent seed from the bag house/electrostatic precipitator section of a MHD power plant containing 0.8104 grams potassium sulfate per gram of seed is added to water to provide samples having a weight ratio of equivalent potassium sulfate to water of 8:100 and 14:100. The samples are mixed for the times specified in Table 1 below and at the temperatures shown.

TABLE 1

RESULTS FROM SPENT SEED DISSOLUTION TESTS

| Run # | Conc.+ | Temp (°F.) | Mixing Time (min) | Liquid pH | % K Recovery |
|---|---|---|---|---|---|
| 1 | 8:100 | 140.0 | 10 | 7.1 | 95.50 |
| 2 | | | 20 | 7.4 | 95.69 |
| 3 | | | 40 | 7.2 | 95.73 |
| 4 | | | 80 | 6.9 | 95.88 |
| 5 | | | 160 | 7.1 | 95.57 |
| 6 | | | 320 | 6.9 | 95.52 |
| 7 | 14:100 | 140.0 | 10 | 7.3 | 95.19 |
| 8 | | | 20 | 7.2 | 94.92 |
| 9 | | | 40 | 6.8 | 95.02 |
| 10 | | | 80 | 6.6 | 95.57 |
| 11 | 8:100 | 203.0 | 10 | 6.9 | 95.80 |
| 12 | | | 20 | 7.0 | 95.86 |
| 13* | | | 40 | 6.0 | 95.66 |
| 14* | | | 80 | 6.1 | 95.47 |
| 15* | | | 160 | 6.1 | 95.66 |

+Concentration is expressed as the weight ratio of $K_2SO_4$ to water.
*Slightly acidic pH was found due to acidic nature of demineralized water used in these experiments.

As shown in the last column of Table 1 the percentage of potassium recovered in the solution was about 95% for all samples and was not particularly dependent on the temperature or the mixing time. It is noted that potassium recoveries shown in Table 1 are based on total potassium within the spent seed samples. This necessarily takes into account potassium in both the water-soluble form and insoluble forms, the water-soluble form being potassium sulfate and the insoluble form being potassium combined with aluminosilicates within slag particles contained in the samples. For all tests, recovery based on soluble potassium approached 100%.

EXAMPLE 2

Figure 2:
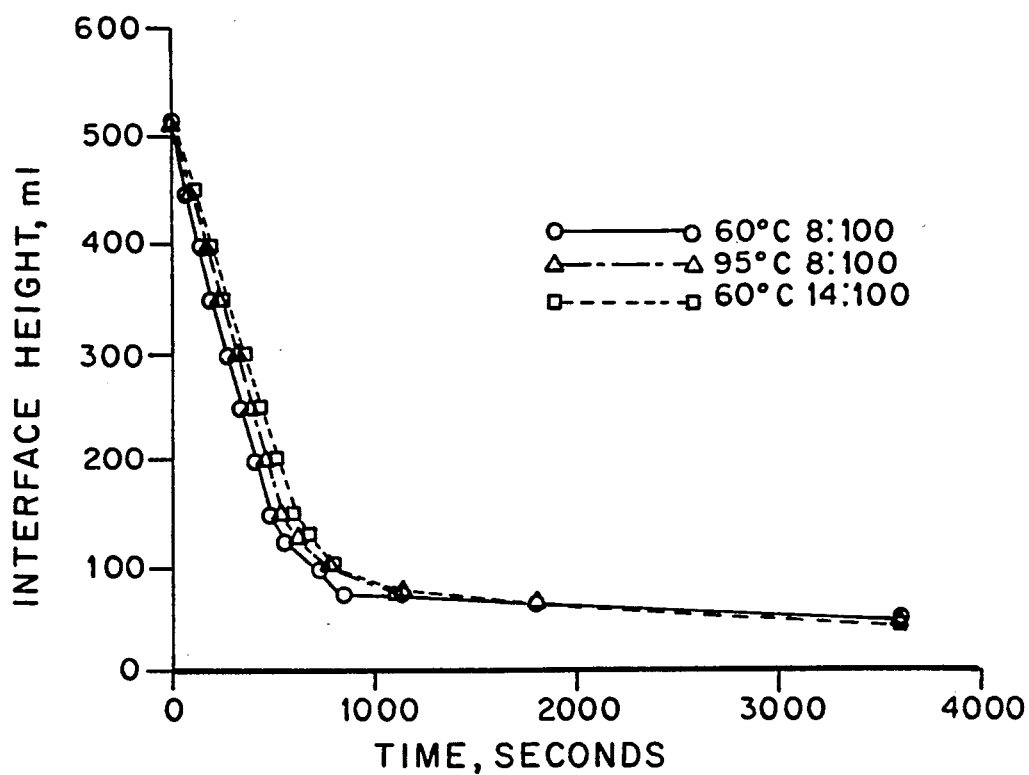
FIG. 2 is a plot of interface height versus time at various temperatures and concentrations to illustrate the effect of temperature and concentration on the settling rate of unflocculated spent seed material in a slurry.

Spent seed samples as described in Example 1 are mixed in water to provide weight ratios of equivalent potassium sulfate to water of 8:100 and 14:100. Samples are stirred for at least 10 minutes to provide a homogeneous slurry. The samples are then transferred to stoppered graduated cylinders which were placed in a constant temperature water bath maintained at either 140° or 203° F. The interface height, i.e., line of demarcation between the clear supernatant liquid and the insolubles-containing bottom fraction, was recorded as a function of time for each sample. At the end of one hour, the experiment was stopped. The results are shown in FIG. 2.

Equilibrium results from the tests are shown in Table 2 below.

TABLE 2

SETTLING OF UNTREATED SOLIDS

| Run # | Temp (°F.) | Conc. | Initial Settling Rate (ft/min) | Overflow Density (g/cc) | Underflow Density (g/cc) |
|---|---|---|---|---|---|
| 2A-1 | 140 | 8:100 | 0.154 | $5.28 \times 10^{-5}$ | 0.134 |
| 2A-2 | 203 | 8:100 | 0.128 | $5.44 \times 10^{-5}$ | 0.162 |
| 2A-3 | 140 | 14:100 | 0.152 | $5.16 \times 10^{-5}$ | 0.131 |

Figure 3:
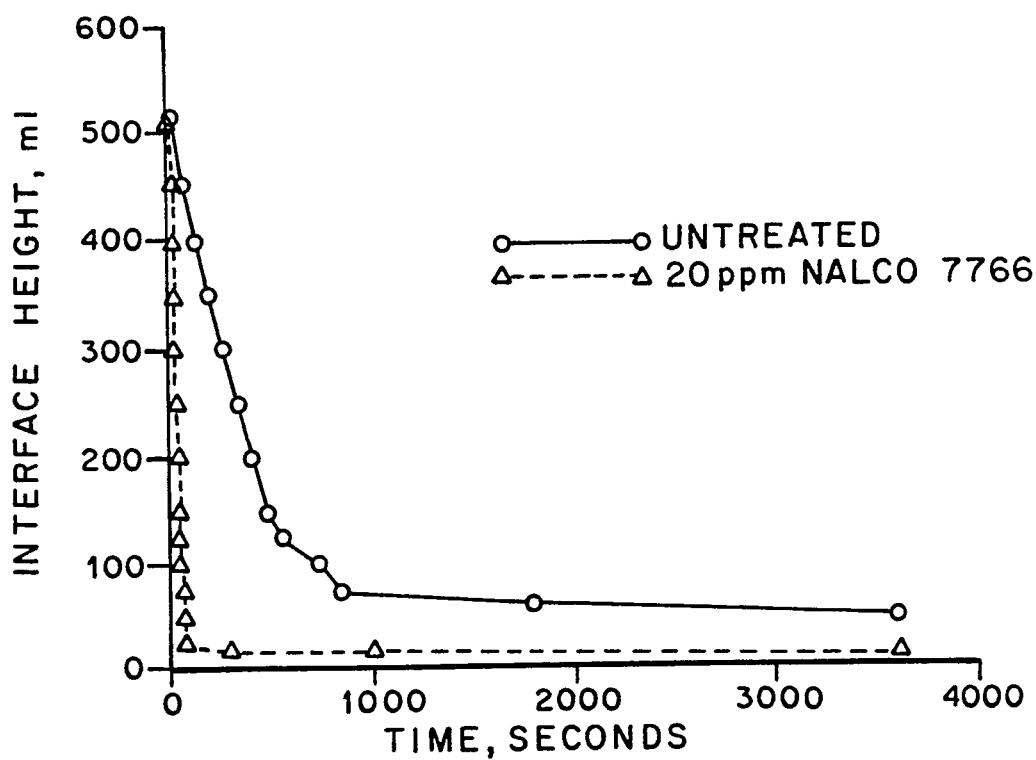
FIG. 3 is a plot of interface height versus time for flocculated and unflocculated slurries to illustrate the effect of the flocculant on the settling rate of spent seed material in the slurries.

Additional samples were prepared but were flocculated using the weakly anionic flocculant sold under the trade name "Nalco 7766" by the Nalco Chemical Company of Oak Brook, Ill. The samples were stirred for 15 minutes and then allowed to settle for 15 minutes. The interface height of an 8:100 flocculated $K_2SO_4$ solution is shown in FIG. 3 and compared with the interface height of the same solution concentration for an unflocculated sample. FIG. 3 shows that the flocculated sample settled at a rate approximately 10 times that of the unflocculated sample. Tables 3 and 4 below show the performance of the flocculant in improving the settling rate and underflow density of the samples as compared to Table 2 shown above.

TABLE 3
PERFORMANCE OF SELECTED FLOCCULANT NALCO 7766 FOR SETTLING OF SOLIDS

| Run # | Floc. | ID | Type | Dosage (ppm) | Overflow Density (g/cc) | Underflow Density (g/cc) |
|---|---|---|---|---|---|---|
| 2A-11 | Nalco | 7766 | anionic | 10 | $1.55 \times 10^{-4}$ | 0.280 |
| 2A-9 | Nalco | 7766 | anionic | 20 | $1.15 \times 10^{-4}$ | 0.336 |
| 2A-12 | Nalco | 7766 | anionic | 50 | $1.04 \times 10^{-4}$ | 0.339 |
| 2A-13 | Nalco | 7766 | anionic | 100 | $9.14 \times 10^{-5}$ | 0.342 |
| 2A-14 | Nalco | 7766 | anionic | 200 | $7.45 \times 10^{-5}$ | 0.335 |

TABLE 4
SETTLING OF SOLIDS TREATED WITH 20 PPM DOSE NALCO 7766

| Run # | Temp (°F.) | Conc. | Settling Rate (ft/min.) | Overflow Density (g/cc) | Underflow Density (g/cc) |
|---|---|---|---|---|---|
| 2A-15 | 140 | 8:100 | 1.50 | $1.15 \times 10^{-4}$ | 0.336 |
| 2A-16 | 203 | 8:100 | 1.51 | $1.20 \times 10^{-4}$ | 0.357 |
| 2A-17 | 140 | 14:100 | 1.50 | $1.28 \times 10^{-4}$ | 0.428 |

EXAMPLE 3

A Parr 450 ml. stirred autoclave capable of operating of pressures up to 2,500 psig and a stirring speed of 600 rpm is charged with 10 gram samples of slag from the radiant furnace section of an MHD plant. The slag was ground to provide varying mass mean diameters. Based on chemical analysis of the slag, an amount of calcium hydroxide was added to give a desired molar OH/K ratio. Two hundred ml. of deionized water was then added to the bomb for each sample and the bomb was sealed. When the bomb reached the desired temperature, a timer was started. At the end of the specified time, the bomb was removed from the heating mantle and immediately quenched in cold water. The liquid fraction and solids were analyzed for potassium content and the results are shown below in Table 5.

TABLE 5
RESULTS FROM SLAG LEACHING EXPERIMENTS

| Run # | Mass Mean Dia. (microns) | Temp (°F.) | Mixing Time (hr) | OH/K molar ratio | % K Recovery | Parameter Varied |
|---|---|---|---|---|---|---|
| 1 | 190 | 482 | 2.0 | 2:1 | 34.0 | Molar OH/K |
| 2 | 190 | 482 | 2.0 | 4:1 | 72.5 | Molar OH/K |
| 3 | 190 | 482 | 2.0 | 6:1 | 75.0 | Molar OH/K |
| 4 | 190 | 302 | 2.0 | 4:1 | 21.0 | Temperature |
| 5 | 190 | 392 | 2.0 | 4:1 | 53.0 | Temperature |
| 6 | 190 | 482 | 1.0 | 4:1 | 55.5 | Mixing Time |
| 7 | 190 | 482 | 4.0 | 4:1 | 73.0 | Mixing Time |
| 8 | 68 | 482 | 2.0 | 5:1 | 80.0 | Particle Size |
| 9 | 190 | 482 | 2.0 | 5:1 | 76.0 | Particle Size |
| 10 | 1400 | 482 | 2.0 | 5:1 | 25.9 | Particle Size |
| 11 | <149 | 482 | 2.0 | 4:1 | 74.0 | Insol. spent seed |
| 12 | <149 | 250 | 2.0 | 4:1 | 74.0 | Insol. spent seed/slag |

Chemical analysis of liquid and solid fractions of a representative run were completed to determine the disposition of trace elements. The results are shown below in Table 6.

TABLE 6
ANALYSIS OF REPRESENTATIVE LIQUID AND SOLID FROM SLAG LEACHING

LIQUID FRACTION:

| Element | Conc. (ppm) |
|---|---|
| Na | 12.2 |
| Si | 2.3 |
| Al | 22.9 |
| Fe | <0.2 |
| Ti | <1.0 |
| Ca | 8.6 |
| Mg | 0.3 |
| K | 870. |
| SO$_4$ | <1.0 |
| Cl | 5.7 |

SOLID FRACTION

| Element | Weight % |
|---|---|
| SiO$_2$ | 31.7 |
| Al$_2$O$_3$ | 18.5 |
| Fe$_2$O$_3$ | 7.6 |
| TiO$_2$ | 0.7 |
| CaO | 36.7 |
| MgO | 1.1 |
| Na | 0.06 |
| K$_2$O | 2.8 |
| SO$_3$ | <0.1 |
| Cl | ND |
| TOTAL | 99.96 |

ND — Not Detected

EXAMPLE 4

Ten-gram samples of spent seed material from the baghouse of an MHD plant are mixed with 100 ml. portions of deionized water at room temperature for 45 minutes. In some of the samples, the slurry was filtered to remove insoluble fly ash material with the filtrate being primarily an aqueous solution of potassium sulfate. In other samples, the soluble and insoluble fractions were retained in the slurry. Calcium hydroxide was added in varying stoichiometric ratios to the total quantity of potassium in each solution.

For each test, a Parr batch reaction vessel was charged with the sample and sealed. The vessel has a capacity of 450 ml., is made of 316 stainless steel and rated for pressures to 3,000 psig and temperatures to 350° C. The vessel is also equipped with a stirrer capable of providing a stirring speed ranging from 400 to 1,700 rpm. A high pressure tank is connected to the vessel and contains a supply of reagent grade carbon monoxide for admitting to the reactor.

For the tests, the heater and stirring motor were initiated and the vessel temperature adjusted to a desired set point. Approximately 30 minutes were required to reach a nominal operating temperature of 392° F. After achieving a steady vapor pressure in the reactor of about 200 psig, carbon monoxide was admitted to the reactor to give varying initial partial pressures of carbon monoxide. After the reaction was judged complete from a stabilized system pressure (usually about 170 psi drop in pressure), the bomb was quenched in a water bath and the remaining pressure vented. The product slurry was filtered and the filter cake was washed with 200 ml. of deionized water to remove any soluble species from the cake.

Results from the experiments were determined from chemical analysis of both the filtered solids and the filtrate solution. Conversion of calcium hydroxide to formate was determined by comparing the moles of formate in the product solution with the moles of hydroxide initially added as calcium hydroxide. Additionally, incomplete conversion could be verified by the solution pH, since a solution pH significantly above 7 indicated that calcium hydroxide was still present. The fractional conversion was calculated according to the following equation:

$$\text{calcium hydroxide conversion} = \frac{2 * \text{moles of formate in product solution}}{\text{moles of calcium hydroxide added initially}}$$

Potassium recovery was calculated by subtracting the potassium remaining in the filtered solids from the amount of potassium in the starting solution. The calculation for fractional potassium recovery (sodium recovery was calculated in a similar manner) was determined as follows:

$$\text{potassium recovery} = \frac{\text{potassium in feed sol'n} - \text{potas'm in filtered solids}}{\text{potassium in feed solution}}$$

The conversion of potassium sulfate to potassium formate was determined by analysis of cations and anions from the product solution. The calculation is shown in the following equation:

$$\text{potassium conversion} = \frac{SO_4^= I - (SO_4^= F - SO_4^= C)}{SO_4^= I}$$

where,
$SO_4^=I$—moles of sulfate anion present in initial solution
$SO_4^=F$—moles of sulfate anion present in final solution
$SO_4^=C$—moles of sulfate anion present in final solution as calcium sulfate (assumed to be saturated)

In these experiments, the calcium stoichiometry was defined as the ratio of the molar equivalents of calcium hydroxide to potassium and sodium combined in the feed solution, or:

$$\text{Ca stoichiometry} = \frac{\text{moles of } Ca(OH)_2 \text{ added initially}}{\text{moles of } K_2 + \text{moles } Na_2 \text{ in product sol'n}}$$

A calcium stoichiometry of 1.0 would be the theoretical quantity of calcium hydroxide required to complete the formate reaction according to the following equation:

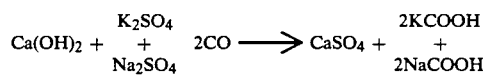

Higher calcium stoichiometries would indicate that excess quantities of calcium hydroxide were used.

The effect of varying the temperature on the equilibrium conversion in the batch reactor is shown below in Table 7.

TABLE 7

| | EFFECT OF TEMPERATURE ON BATCH FORMATE REACTOR | | | | |
|---|---|---|---|---|---|
| Temp °F. | K conversion to COOH | K recovery | Na recovery | Ca conversion to COOH | pH of sol'n diluted to 500 ml |
| 347 | 0.819 | 0.848 | 0.848 | 0.995 | 10.2 |
| 392 | 0.886 | 0.993 | 0.912 | 1.05 | 5.6 |

TABLE 7-continued

| | EFFECT OF TEMPERATURE ON BATCH FORMATE REACTOR | | | | |
|---|---|---|---|---|---|
| Temp °F. | K conversion to COOH | K recovery | Na recovery | Ca conversion to COOH | pH of sol'n diluted to 500 ml |
| 455 | 0.894 | 0.994 | 0.958 | 1.07 | 5.1 |

Base Conditions: 600 rpm, 30 atm CO, 1.0 Ca stoichiometry, 40 min. run time

The effect of the reaction temperature and reaction time on the calcium hydroxide conversion (CO consumption) is shown in FIG. 4.

The effect of varying the mixing speed on the equilibrium conversion in the batch reactor is shown below in Table 8.

TABLE 8

| | EFFECT OF MIXING SPEED ON BATCH FORMATE REACTOR | | | | |
|---|---|---|---|---|---|
| Mixing speed (rpm) | K conversion to COOH | K recovery | Na recovery | Ca conversion to COOH | pH of sol'n diluted to 500 ml |
| 400 | 0.911 | 0.996 | 0.916 | 1.01 | 5.4 |
| 600 | 0.886 | 0.993 | 0.912 | 1.05 | 5.6 |
| 1000 | 0.926 | 0.995 | 0.942 | 1.10 | 5.9 |
| 1700 | 0.880 | 0.994 | 0.921 | 1.04 | 6.0 |

Base Conditions: 392° F., 30 atm CO, 1.0 Ca stoichiometry, 40 min. run time

The mixing speed did not have a significant effect on the equilibrium conversion. But the mixing speed did have a pronounced effect of the rate of CO consumption as shown in FIG. 5 which plots the square of the mixing speed versus the reciprocal of the time required to reduce the reactor pressure by 100 psig.

The effect of varying the initial carbon monoxide partial pressure on the equilibrium conversion obtained in the batch reactor is shown below in Table 9.

TABLE 9

| | EFFECT OF CO PARTIAL PRESSURE ON BATCH FORMATE REACTOR | | | | |
|---|---|---|---|---|---|
| Partial Press CO | K conversion to COOH | K recovery | Na recovery | Ca conversion to COOH | pH of sol'n diluted to 500 ml |
| 20 atm | 0.884 | 0.992 | 0.928 | 1.02 | 6.8 |
| 30 atm | 0.886 | 0.993 | 0.912 | 1.05 | 5.6 |
| 50 atm | 0.890 | 0.994 | 0.876 | 1.00 | 5.1 |

Base Conditions: 600 rpm, 392° F., 1.0 Ca stoichiometry, 40 min. run time

The effect of varying the calcium stoichiometry on the equilibrium conversion obtained in the batch reactor is shown below in Table 10.

TABLE 10

| | EFFECT OF CALCIUM STOICHIOMETRY ON BATCH FORMATE REACTOR | | | | |
|---|---|---|---|---|---|
| Calcium Stoic | K conversion to COOH | K recovery | Na recovery | Ca conversion to COOH | pH of sol'n diluted to 500 ml |
| 1.0 | 0.886 | 0.993 | 0.912 | 1.05 | 5.6 |
| 1.1 | 0.935 | 0.992 | 0.845 | 0.967 | 5.6 |
| 1.2 | 0.992 | 0.996 | 0.919 | 1.03 | 5.9 |

Base Conditions: 600 rpm, 392° F., 30 atm CO, 40 min. run time

The effect of varying the reaction time between about 13 minutes and 120 minutes is shown below in Table 11.

TABLE 11

EFFECT OF REACTION TIME ON BATCH FORMATE REACTOR

| Run Time min | K conversion to COOH | K recovery | Na recovery | Ca conversion to COOH | pH of sol'n diluted to 500 ml |
|---|---|---|---|---|---|
| 1.0 Ca stoichiometry | | | | | |
| 40 | 0.886 | 0.993 | 0.912 | 1.05 | 5.6 |
| 60 | 0.911 | 0.996 | 0.916 | 1.01 | 5.4 |
| 120 | 0.926 | 0.996 | 0.942 | 1.09 | 5.1 |
| 1.2 Ca stoichiometry | | | | | |
| 13 | 0.952 | 0.993 | 0.935 | 0.916 | 6.6 |
| 22 | 0.950 | 0.995 | 0.909 | 1.03 | 6.0 |
| 31 | 0.970 | 0.994 | 0.922 | 1.04 | 5.8 |
| 40 | 0.992 | 0.996 | 0.919 | 1.03 | 5.9 |

Base Conditions: 600 rpm, 392° F., 30 atm CO

EXAMPLE 6

A feed solution for continuous formate reaction tests was prepared by dissolving one part spent seed in ten parts deionized water. The continuous reactor consisted of a two liter, 316 stainless steel vessel having an internal diameter of approximately three inches and a length of nine inches. The vessel was rated for 5750 psig, 572° F., and was equipped to provide a stirring speed of from 100 to 2,500 rpm. Agitation was provided by a packless magnetically driven shaft in conjunction with a variable speed DC motor equipped with a speed controller and tachometer. The stirring shaft was outfitted with three spaced apart four-bladed impellers. A proportional temperature controller operated a 1.2 kilowatt heater which jacketed the reactor. The reactor was designed with two penetrations at the bottom for fluid charging (slurry and carbon monoxide) and one penetration at the top for product withdrawal. The product slurry from the vessel was conducted to a high-pressure separation tank where the slurry would be collected by gravity and the back pressure regulator controlled the entire system pressure.

The slurry pump (inlet pump) and the reactor were sized to provide a nominal residence time of approximately 120 minutes.

The feed slurry was supplied to the reactor vessel using a mix tank together with a slurry metering pump. The tank had a capacity of approximately 12 liters and was equipped with variable speed controls. The pump was designed to deliver a 20% calcium hydroxide slurry from ambient pressure to 2,500 psig and consisted of a variable stroke length plunger which pneumatically operated a series of two diaphragms. The pumping capacity was approximately 2.5 liters per hour with a turn-down ratio of about 10:1. The outlet of the pump was directed into the bottom of the reactor. Carbon monoxide and nitrogen were supplied to the reactor from high pressure tanks outfitted with regulators capable of delivering up to 1,000 psig outlet pressure. The gases from each tank passed through a fine metering valve and then through a Kurz mass flow meter capable of measuring flow rates from 0 to 10 standard liters per minute at pressures up to 1,500 psig. The gases were supplied to the bottom of the reactor in a cocurrent flow with the slurry.

For each test, the system was purged with nitrogen and system pressure adjusted to approximately 600 psig. The temperature of the reactor vessel was increased to about 390° F. as the metering pump fed water into the reactor. Approximately one hour was required to achieve steady temperatures and pressures in the system after which carbon monoxide and calcium hydroxide-containing spent seed slurry were fed into the reactor at varying flow rates. The product was determined to be representative of steady state operations after the length of time required for the slurry to replace two reactor volumes had elapsed. Once steady state flow conditions were achieved, the test was continued until about two liters of product were obtained. For each test, the product slurry was then filtered to separate calcium sulfate solids and both solids and filtrate were analyzed.

Two tests were conducted, each with a residence time of approximately 31 minutes. The carbon monoxide stoichiometry was varied between 1.5 and 2. The results are shown below in Table 12.

TABLE 12

CONTINUOUS FORMATE REACTOR RESULTS

| CO stoichiometry | CO utilization | K conversion | Ca conversion |
|---|---|---|---|
| 2.0 | 0.50 | 0.941 | 1.0 |
| 1.5 | 0.56 | 0.926 | 0.84 |

Base Conditions are:
(1) 600 rpm
(2) 200° C.
(3) 30 atm CO
(4) 1.2 Ca stoichiometry
(5) 31 min. residence time

EXAMPLE 7

Approximately 330 ml. of a 50% solution of potassium formate (pH 6.9) was diluted to 34 wt. % using deionized water to produce a diluted solution volume of about 488 ml. To the diluted solution, a high-strength potassium hydroxide solution was added until the pH increased to about 10.07 providing a final volume of 500 ml. The solution was placed into a flask on an electric mantle. An overhead, tap water-cooled condenser was attached to the top of the flask. The solution was brought to boiling under continuous stirring with a magnetic stirrer and condensate was collected in a flask immersed in an ice water bath until 250 ml. of the solution was evaporated and condensed in the flask. The pH of the concentrate and the pH of the distillate were measured during evaporation tests. The results are shown below in Table 13.

TABLE 13

RESULTS FROM EVAPORATION OF KCOOH, KOH MIXTURE

| Characteristic | Concentrate Sample | Distillate Sample |
|---|---|---|
| TDS, ppm | 870,000 | — |
| TOC, ppm | 120,000 | 5.2 |
| pH | 12.1 | 8.5 |
| Potassium, ppm | 380,000 | — |
| Conductivity, micromhos/cm | — | 74 |

TDS = total dissolved solids
TOC = total organic carbon

The apparent volatilization of formic acid is quite low. Given a distillate total organic carbon of 5.2 ppm, the corresponding formic acid would be 20 ppm. There apparently was a minute carryover of potassium because the distillate pH was about 8.5. The results show that there is no significant loss of potassium formate into the distillate and that a low pH distillate is avoided by maintaining the pH of the potassium formate at at least about 10 using potassium hydroxide.

Among the many advantages associated with the process of the present invention are the high potassium recoveries and the relative simplicity of the operations that make up the processing steps. The formate reaction takes place in a single reactor vessel under relatively mild conditions of 392° F. and 670 psia and the soluble potassium recovered from the spent seed is converted to a sulfur-free form (potassium formate) with an overall conversion in the range of 93 to 99%. Formation of undesirable double salts of potassium is avoided at these conditions. About 80% of the total potassium present in the slag and insolubles from the spent seed may be solubilized and recovered as a solution of potassium hydroxide in a single processing step using lime digestion. The recovered potassium is in a sulfur-free form and, if mixed with the formate product, elevates the pH of the resulting mixture so that corrosion problems associated with the formation of formic acid during evaporation are eliminated or minimized and precipitation of calcium salts is promoted. The potassium formate-containing solution may be evaporated in a multi-effect evaporator to achieve steam economy and be further dried using a kiln and rising film finishing evaporator. The dried potassium formate may then be oxidized to potassium carbonate in a kiln to provide the potassium salt in the form of potassium carbonate. If under the circumstances it is not necessary to oxidize, the potassium formate can be fed directly to the MHD combustor in various forms.

The overall potassium recovery achievable by the process of the present invention is at least about 93% when the slag is not processed and is at least about 97% when the slag is processed by lime digestion. In either case, the purity of the resulting product that is recycled to the MHD combustor is at least about 98% and the recycled seed is substantially free of sulfur.

In terms of the economics, for a 300 megawatt ton-sized plant with various options, the capital and operating costs for the process of the invention are estimated to be in the neighborhood of $22 to $26 Million, and $6.3 to $6.9 Million respectively. For a similar plant retrofitted with a lime/limestone-based wet flue gas scrubbing option for sulfur control, the capital and operating costs are about $50.4 Million and $7.10 Million respectively. End/waste products derived from the process of the invention are environmentally acceptable and the potential solid wastes are non-hazardous and therefore disposable in a landfill if desired.

The foregoing description of preferred embodiments of the invention and of certain features and advantages associated therewith is for the purpose of illustration. Those of ordinary skilled art will recognize that the invention is capable of numerous rearrangements, substitutions and modifications without departing from the scope and spirit of the following claims.

What is claimed is:

1. In an MHD method involving combustion of a sulfur-containing fossil fuel to produce a high-temperature flue gas wherein the gas is seeded with an ionizable alkali metal salt to render the gas electrically conductive by ionization of the alkali metal salt therein to enable generation of electricity by passage of the conductive gas through a magnetic field at a high velocity, and wherein alkali metal ions in the gas react with sulfur dioxide and slag produced by combustion of the fuel to form solid combustion products including a spent seed material containing the alkali metal sulfate and a slag material containing alkali metal aluminosilicates, an improvement in the method of recovering the alkali metal from the combustion products and regenerating the alkali metal to a sulfur-free form suitable for use in providing the seed material which comprises collecting the combustion products from the gas, dissolving the alkali metal sulfate from the spent seed in water to provide an aqueous solution thereof, reacting the alkali metal sulfate in the solution with calcium hydroxide and carbon monoxide to form an alkali metal formate and calcium sulfate, adjusting the pH of the alkali metal formate solution to promote precipitation of any dissolved calcium salts and to suppress subsequent formation of formic acid, and employing the alkali metal formate solution as a source for the alkali metal salt seed material.

2. The method according to claim 1, further comprising digesting the slag material in an aqueous slurry of calcium hydroxide to cause an exchange of the calcium from the calcium hydroxide with the alkali metal in the alkali metal aluminosilicates in the slag material to form an alkali metal hydroxide in the solution and calcium aluminosilicates in the slag, and employing the solution containing the akali metal hydroxide to adjust the pH of the alkali metal formate solution as aforesaid.

3. The method according to claim 2, wherein the digestion of the slag is carried out in the aqueous slurry of calcium hydroxide by employing a molar ratio of calcium hydroxide to the alkali metal of about 4 at a temperature of about 450° F., and for a time period of at least about 120 minutes.

4. The method according to claim 1, wherein the alkali metal is potassium and wherein, in a single step, the reaction of the potassium sulfate in the solution with calcium hydroxide and carbon monoxide is carried out at a temperature in the range of from about 390° F. to about 455° F. and a total pressure of from about 600 psia to about 670 psia for at least about ten minutes with a carbon monoxide partial pressure of at least about 450 psia and a stoichiometric excess of calcium hydroxide to potassium sulfate of about 20%.

5. The method according to claim 1, wherein the alkali metal is potassium and wherein, the dissolution of potassium sulfate from the seed in water is carried out by supplying the spent seed to the water in a weight ratio equal to from about 8:100 to about 14:100 and heating the water to a temperature in the range of from about 140° F. to about 195° F.

6. The method according to claim 1, wherein the alkali metal is potassium and wherein, the potassium formate solution is employed to provide the potassium salt seed material by concentrating the solution to near the precipitation point of potassium formate to provide a concentrated potassium formate solution and then injecting the concentrated potassium formate solution into the flue gas.

7. The method according to claim 1, wherein the alkali metal is potassium and wherein, the potassium formate solution is employed to provide the potassium salt seed material by evaporating water from the solution to precipitate the potassium formate reducing the moisture content of the potassium formate precipitate to provide a relatively dry potassium formate solid, and then adding the dried potassium formate to the fuel for providing the potassium salt seed material.

8. The method according to claim 1, wherein the alkali metal is potassium and wherein, the potassium formate solution is employed &o provide the potassium salt seed material by separating the potassium formate from the solution as a substantially dry power, and then adding the potassium formate powder to the fuel for providing the potassium salt seed material.

9. The method according to claim 1, wherein the alkali metal is potassium and wherein, the potassium formate is employed to provide the potassium salt seed material by separating the potassium formate from the solution as a substantially dry powder, heating the potassium formate powder under oxidizing conditions to form a potassium carbonate powder, and then adding the potassium carbonate powder to the fuel for providing the potassium salt seed material.

10. The method according to claim 9, wherein the alkali metal is potassium and wherein, the potassium formate is separated from the solution as a substantially dry powder by evaporating water from the solution to near the precipitation point of potassium formate to provide a concentrated solution and then drying the concentrated solution to provide the substantially dry powder.

* * * * *

UNITED STATES PATENT AND TRADEMARK OFFICE
CERTIFICATE OF CORRECTION

PATENT NO. : 5,057,294
DATED : October 15, 1991
INVENTOR(S) : Atul C. Sheth, et al It is certified that error appears in the above-identified patent and that said Letters Patent is hereby corrected as shown below:

IN THE ABSTRACT

Line 2, "MHM" should be --MHD--.

Column 18, line 42, after "wherein", delete --,--.

Column 18, line 49, after "wherein", delete --,--.

Column 18, line 57, after "wherein", delete --,--.

Column 18, line 66, after "wherein", delete --,--.

Column 18, line 67, "&o" should be --to--.

Column 19, line 5, after "wherein", delete --,--.

Column 20, line 4, after "wherein", delete --,--.

Signed and Sealed this

Twenty-ninth Day of June, 1993

Attest:

MICHAEL K. KIRK

*Attesting Officer*     *Acting Commissioner of Patents and Trademarks*